(No Model.)

N. S. KETCHUM & S. D. PALMER.
ROAD CART.

No. 391,250. Patented Oct. 16, 1888.

Witnesses:
J. P. Theo. Lang.
E. J. Fenwick.

Inventors:
Nathaniel S. Ketchum
States D. Palmer,
by their Attys
Mason, Fenwick & Lawrence

UNITED STATES PATENT OFFICE.

NATHANIEL S. KETCHUM AND STATES D. PALMER, OF MARSHALLTOWN, IOWA, ASSIGNORS TO THE KETCHUM WAGON COMPANY, OF SAME PLACE.

ROAD-CART.

SPECIFICATION forming part of Letters Patent No. 391,250, dated October 16, 1888.

Application filed July 16, 1888. Serial No. 280,087. (No model.)

*To all whom it may concern:*

Be it known that we, NATHANIEL S. KETCHUM and STATES D. PALMER, citizens of the United States, residing at Marshalltown, in the county of Marshall and State of Iowa, have invented certain new and useful Improvements in Road-Carts; and we do hereby declare the following to be a full, clear, and exact description of the invention, such as will enable others skilled in the art to which it appertains to make and use the same.

Our invention has for its object the production of a vehicle which shall combine lightness and durability of construction with ease and convenience of use at a very small cost, and to this end we have devised a vehicle which we have termed the "Ketchum cart," and which in use relieves all weight from the back of the horse, which relieves the occupant of its seat when driving from the disagreeable "horse-motion" incident to the class of vehicles known as "road-carts," and which is free from "throw" when going over obstructions and from forward and back pitch in ruts; and it consists in certain novel constructions, combinations, and arrangement of parts for the accomplishment of these results, as will be hereinafter described and specifically claimed, reference being had to the accompanying drawings and the letters of reference thereon, in which—

Figure 1:
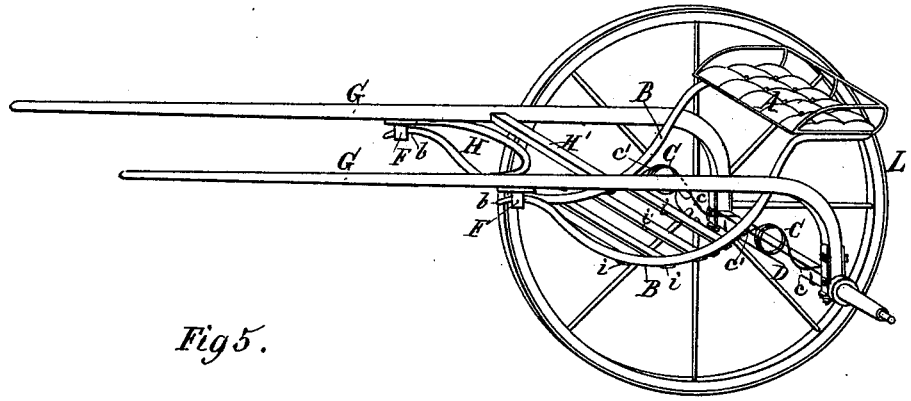
Figure 5:
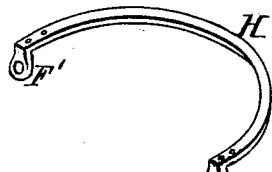
Figure 4:
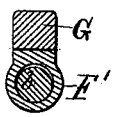
Figure 3:
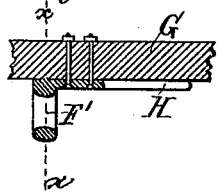
Figure 2:
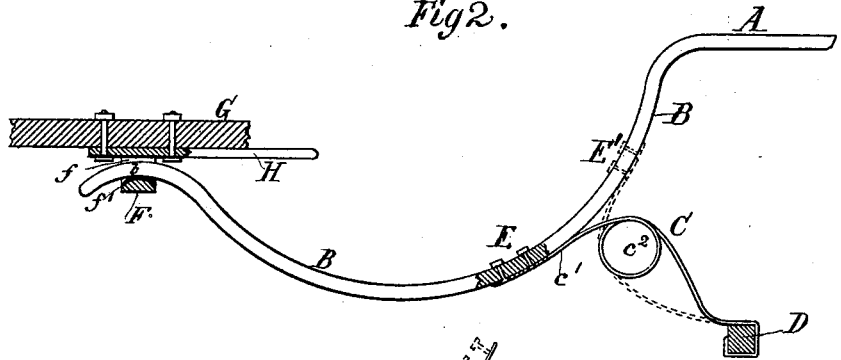
Figure 6:
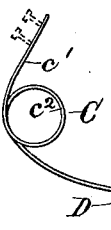

Figure 1 is a perspective view of our improved road cart, one wheel being removed in order at a glance to clearly present to the eye of the observer its simplicity and desirableness of construction. Fig. 2 is a modification, partly in section, of Fig. 1, and shows but one of the combined bottom side-bar seat-bows upon which the driver's seat is mounted and how the bottom of the boot, box, or body may be constructed. Fig. 3 is a broken sectional view of one of the shafts of the vehicle and with a modification, in the likeness of a ring, of the oscillation-box shown in Figs. 1 and 2 for the forward end of the combined bottom side-bar seat-bows to pass through. Fig. 4 is a section in the line *x x* of Fig. 3, and indicates in section the forward end of one of the said seat-bows as passing through the said ring. Fig. 5 is a modified detail view of the U-shaped brace between the shafts shown in Fig. 1, and Fig. 6 shows in reversed position by solid lines the coil-spring shown by solid lines in Fig. 2.

In the figures, A indicates the driver's seat of our improved road-cart, mounted, preferably, as shown, upon seat-bows B B, which, when the boot, box, or body of the cart is constructed as shown, are supported upon coil-springs C C, which connect said bows, respectively, with the axle of the vehicle. Instead of having the seat mounted upon seat-bows, it may be mounted upon a boot, box, or body formed with spaced or closely-adjoined slats or pieces of board or other material forming the said bottom. Whatever may be the construction of the cart-body, the rear portions, *c c*, of the springs C C are passed around or secured upon the axle D of the vehicle, with their ends preferably seated in slight countersinks in the axle D, in order to prevent longitudinal movement upon the axle; or the rear portions, *c c*, may at their outer ends be applied fixedly to the axle D in any suitable manner. The forward portions, *c' c'*, of the coil-spring C C are fixedly attached by bolts or rivets, preferably, to the respective seat-bows B B, as indicated in broken sectional lines at E in Fig. 2; or these connections may be fixedly effected in any suitable manner to the boot, box, or body of the vehicle when the seat-bows are not adopted. The seat-bows B B, when adopted, are extended forward in the form of the bottom of the cart boot, box, or body, and are extended beyond the same and terminated in connecting slide ends *b'*, which pass through and are in normal position supported by what we term "oscillation-boxes" F, (clearly shown in Fig. 2,) applied either to the under side of each of the shafts G G or—and preferably so— to the cross-bar or circle-bar, or any part by which the shafts are coupled; or they may be attached to parts belonging to the pole, if a pole is used. These boxes have their interior surfaces, *f*, lined with leather, *f'*, or other suitable lining, for preventing rattling within the boxes of the forwardly-extended connecting slide ends of the bows or of similar connecting slide ends *b* attached to and projecting from the front of the boot, box, or body. The boxes may be fixedly or otherwise suitably attached to their support or supports.

In Fig. 1 the shafts G G are, at their rear terminations, shown firmly attached to the axle D, so as to bring them immediately upon the outside of the seat-bows, and thus, by applying bottom cross-pieces, as at $i$, (spaced or adjoining,) to the bowing portions of the seat-bows B, a convenient boot or box is formed for the limbs and feet of the driver, as well as in which to stow away articles necessary to be carried. These shafts G, as shown in Fig. 1, are braced by a U-brace, as at H, while a crossbar, as at H', upon which the whiffletree may be mounted, serves to give rigidity of position to the shafts and stay them firmly in place.

In lieu of the oscillation-boxes F, a ring, as F' in Figs. 3 and 4, may be employed, and, if desired, the brace H (shown in Fig. 1) may be substituted by a U-formed brace, as in Fig. 5, the ends of which terminate in rings F' F'.

In Fig. 6 we have shown a modification of the coil-spring C. (Shown in Figs. 1 and 2.) In this modification the forward portion $c'$ of the coil-spring rises up from the coil, $c^2$, and projects upwardly to a point considerably above the coil $c^2$, and then is attached by bolts or rivets at a point, E', on the seat-bows B B, as indicated in dotted lines in Fig. 2, instead of at the point E in said figure. Thus applied, coil-springs, as shown in Fig. 6, will serve in a greatly increased degree as braces for the boot, box, or body of the cart, as well as supports for the driver's seat.

Thus constructed, our road-cart will accommodate itself to the horse motion of the horse hitched to it by reason of the extended ends $b$ of the seat bows or boot, box, or body of the cart, sliding, when the thrust takes place, to and fro in the oscillation-boxes F F, and whenever the wheels L of the cart strike against any obstruction or run into a rut in the road the action of the springs C in conjunction with the capability of the front extended slide ends $b$ of the bows, boot, or box of the cart to slide to and fro in the boxes will prevent the forward surge or throw incident to carts under like circumstances not provided with our invention, as well as their disagreeable "back pitch," thus giving quiet and ease to the person occupying the seat.

By our invention of making provision for sliding and forwardly supporting the cart-body in conjunction with the employment of coiled springs between the axle and the body or boot of the cart the front end or body of the cart is made to remain comparatively stationary, while the tongue or shafts are raised and lowered by the motion of the horse and the most perfect spring-support secured for the seat to oscillate upon. In this manner we are enabled to provide the market with a road-cart which combines the desirable qualities mentioned, and at the same time lightness and durability of construction, and which is simple and of small cost.

What we claim is—

1. A road cart or vehicle having oscillation-boxes lined with an anti-rattling surface applied on its shafts or pole portion and having extended connecting-slides on the front end of its boot, body, or box, which slides are fitted in said boxes and slide back and forth therein, substantially as described.

2. A road cart or vehicle which comprises in its construction an axle, wheels, a driver's seat, a body, box, or boot portion provided with forwardly-extended connecting end slides, oscillation-boxes applied to the shafts or pole portion of the cart or vehicle, and springs placed between the axle and the body, their rear portions running longitudinally and connected to the axle, and their forward portions also running longitudinally and connected to the body of the vehicle, substantially as and for the purpose described.

3. The supporting oscillation-boxes having eyes through them and applied upon the shafts or tongue portion of the road cart or vehicle, in combination with the body, box, or boot portion thereof, supported by coiled springs and having forwardly-extending connecting end slides, an axle, wheels, and a seat, substantially as and for the purpose described.

In testimony whereof we hereunto affix our signatures in presence of two witnesses.

NATHANIEL S. KETCHUM.
STATES D. PALMER.

Witnesses:
H. GERHART,
F. M. SUTTON.